United States Patent
Ramezani

(10) Patent No.: US 11,623,201 B2
(45) Date of Patent: Apr. 11, 2023

(54) VARIABLE VOLUME FLOW REACTOR

(71) Applicant: ODH IP Corp., New York, NY (US)

(72) Inventor: Mahdi Ramezani, Rockville, MD (US)

(73) Assignee: ODH IP CORP., New York, NY (US)

( * ) Notice: Subject to any disclaimer, the term of this patent is extended or adjusted under 35 U.S.C. 154(b) by 0 days.

(21) Appl. No.: 17/706,441

(22) Filed: Mar. 28, 2022

(65) Prior Publication Data

US 2022/0387962 A1 Dec. 8, 2022

Related U.S. Application Data

(60) Provisional application No. 63/194,883, filed on May 28, 2021.

(51) Int. Cl.
*B01J 19/24* (2006.01)
*B01J 19/00* (2006.01)

(52) U.S. Cl.
CPC ......... *B01J 19/248* (2013.01); *B01J 19/0073* (2013.01); *B01J 19/0093* (2013.01); *B01J 19/243* (2013.01); *B01J 2219/00166* (2013.01); *B01J 2219/00894* (2013.01); *B01J 2219/00984* (2013.01)

(58) Field of Classification Search
None
See application file for complete search history.

(56) References Cited

U.S. PATENT DOCUMENTS

| | | | |
|---|---|---|---|
| 9,101,903 B2* | 8/2015 | Zikeli | B29B 7/826 |
| 2012/0094392 A1* | 4/2012 | Batsale | G01K 17/006 |
| | | | 374/45 |

\* cited by examiner

*Primary Examiner* — Lessanework Seifu
(74) *Attorney, Agent, or Firm* — Polsinelli PC

(57) ABSTRACT

Modular reactors comprising a chassis, reactor tubing and optionally a cover are disclosed. The chassis comprises a plurality of channels of different lengths into which a length of reactor tubing is placed to create the reactor portion of the flow reactor.

20 Claims, 7 Drawing Sheets

VARIABLE VOLUME FLOW REACTOR

CROSS REFERENCE TO RELATED APPLICATIONS

This application claims priority from Provisional Application No. 63/194,883, filed May 28, 2021, the entire contents of which are hereby incorporated by reference.

GOVERNMENTAL RIGHTS

This invention was made with government support under DARPA Cooperative Award #HR-0011-16-2-0029 awarded by the Defense Advanced Research Projects Agency of the Department of Defense. The government has certain rights in the invention.

FIELD OF THE INVENTION

The present disclosure is in the field of continuous flow reactors. The disclosure provides modular tube/plug flow reactors for assembling flow reactors of variable sizes.

BACKGROUND OF THE INVENTION

Flow reactors are used for a wide variety of chemical and biological processes within the food, chemical, and pharmaceutical industries to carry out chemical, enzymatic, and biological reactions. The reactors carry material as a flowing stream, where reagents are continuously fed into the reactor in which the chemical reaction proceeds as the reagents travel through the reactor and emerge as a continuous stream of product. Currently, in situations where flexibility in reactor sizes is needed, multiple flow reactors of different sizes have to be manufactured to suit each specific application, making it impractical to quickly adapt reactors. Therefore, there is a need for reactors having the flexibility to easily change the size of the reactor.

SUMMARY OF THE INVENTION

One aspect of the present disclosure encompasses a continuous flow reactor comprising a chassis comprising a plurality of channels, reactor tubing installed in a channel of the chassis, and optionally a cover for partially and/or completely covering the chassis and the reactor tubing. The reactor can further comprise a reactor stack comprising a first and a second reactor stacked at the surface of the first reactor. The reactor chassis can be as described below.

Another aspect of the present disclosure encompasses a chassis for a continuous flow reactor. The chassis comprises a plurality of channels on a surface of the chassis arranged in a double spiral configuration. Each of the channels is operable to accept a plurality of lengths of reactor tubing. The plurality of channels comprises a primary channel comprising a first end and a second end at a side of the chassis. The primary channel further comprises a first spiral channel connected to the first end, and a second spiral channel connected to the second end. The first spiral channel and the second spiral channel are interleaved and connect at a center of the double spiral to form the primary channel extending from the first end to the second end. The primary channel defines a first reactor tubing path.

The chassis also comprises one or more secondary channels, each comprising a first cross-channel extending from a first cross-channel end at a side of the chassis to a connection point within the first spiral channel, and a second cross-channel extending from a second cross-channel end at a side of the chassis to a connection point within the second spiral channel. Each of the secondary channels defines a secondary reactor tubing path comprising an inlet at the first end and an outlet at the second end of the channel. The ends of each channel can be adjacent with respect to each other, and in some aspects the ends of all channels are at one side of the chassis.

The cross section of channels can be U-shaped, a partially circular cross section comprising more than a semicircle, or a semicircle. The U shape and the partially circular cross section can retain the tubing in the channel. The U-shaped cross section provides a sufficiently deep channel to retain the tubing, and the partially circular cross section provides one or two protrusions that partially surround the tubing to thereby retain the tubing in the channel. The chassis can further comprise a cover. The chassis can further comprise depressions or protrusions that are complementary to the channel in the chassis to fully or partially enclose the tubing in the channel of the chassis. For instance, when the cross section of the channels is semicircular or comprises a partially circular cross section comprising more than a semicircle, the chassis can further comprise a cover comprising depressions on a surface of the cover corresponding to the channels in the chassis such that, when the cover is secured on the chassis, the tubing in the channel is completely enclosed in the reactor. The chassis and the cover can comprise complementary means for fastening the cover to the chassis. In some aspects, the means for fastening the cover to the chassis are complementary wedges on the chassis and the cover for sliding the cover into position. In some aspects, the means for fastening the cover to the chassis are a wedge on the cover and a complementary notch on the chassis.

The chassis can comprise a total of 2, 3, 4, 5, 6, 7, 8, 9, 10 or more channels. In such aspects, the chassis can comprise a first cross channel and a second cross channel for each secondary channel. Alternatively, the chassis can comprise one first cross channel and one second cross channel shared by one or more secondary channels. The chassis, the cover, or both can be a metal chassis or any chemically resistant polymer. For instance, the chassis can be an aluminum chassis, and the cover can be transparent or translucent. In some aspects, the chassis is an aluminum chassis and the cover is transparent or translucent.

Yet another aspect of the present disclosure encompasses a reactor stack comprising a first and a second reactor stacked at the surface of the first reactor. In other aspects, the reactor stack can comprise a plurality of two or more reactors, including 3, 4, 5 or more reactors. The number of reactors in a stack can depend on the dimensions of the enclosure in which the reactor stack is used.

An additional aspect of the present disclosure encompasses a collection of reactor parts and optionally other components that can be attached or connected to the reactor. The collection of parts comprises one or more chassis, one or more tubing, optionally one or more covers, and additional components for assembly into reactor modules of the instant disclosure. As used herein, the term "reactor module" refers to an assembled reactor of the instant disclosure, optionally further comprising other components such as sensors, filters, connectors, probes, samplers, or connectors for attaching the reactor to additional devices or systems. The various parts of the collection can be assembled into one or more reactor modules suitable for a desired function. For instance, the one or more chassis can include chassis of different sizes, chassis constructed of different materials or combination of materials, chassis comprising different numbers of secondary channels, chassis comprising channels of sizes capable of accommodating reactor tubing of different external diameters, chassis comprising channel ends at different locations relative to the chassis and/or the ends of each channel, and combinations thereof. Similarly, the one or more covers can include covers of different sizes, covers constructed of different materials or combination of materials, covers comprising channels complementary to channels in one or more chassis of the modules, and combinations thereof. Reactor tubing of the module can include tubing of different external diameters, internal diameters, material, lengths, and combinations thereof.

In some aspects, a method for synthesizing a chemical compound is provided comprising: providing or having provided one or more input materials; transporting the one or more input materials through a continuous flow reactor in a reactor input stream; and subjecting the reactor input stream in the reactor to cause a chemical reaction between the input materials. Materials output from the reactor in a reactor output stream comprise the synthesized chemical compound and can comprise unreacted input materials and side reaction products. The chemical compound can be an active pharmaceutical compound (API) or a precursor of an API. One or more of the input materials can be a product of a chemical reaction conducted in a module fluidically connected with the reactor of the instant disclosure. The modules fluidically connected with the reactor of the instant disclosure include, without limitation, feedstock reagent reservoirs, heaters, valves, flow meters, waste reservoirs, separators, crystallizers, pumps, inline mixers, pressure transducers, controllers, and any combination thereof.

DETAILED DESCRIPTION

Figure 1:
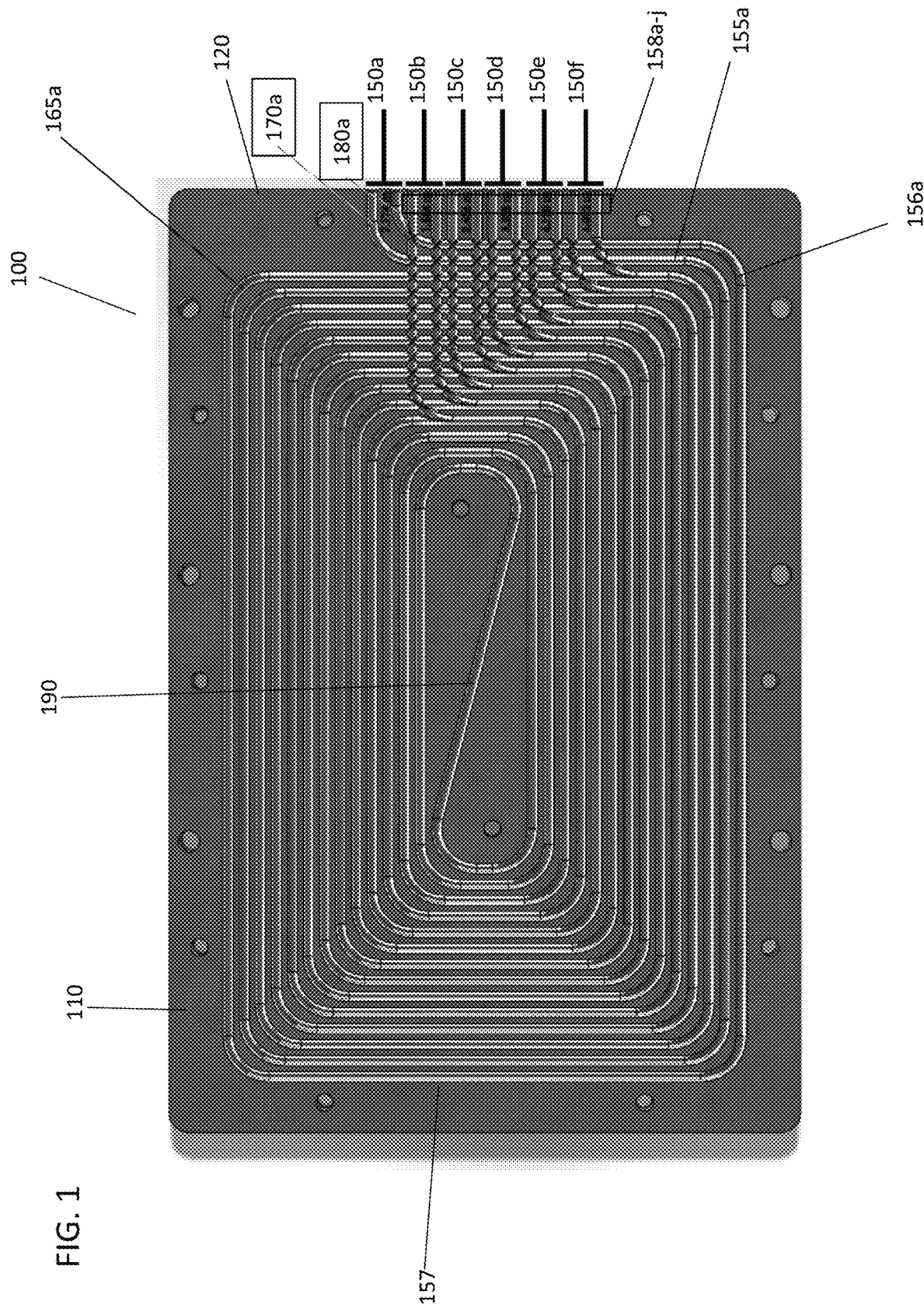
FIG. 1 is top perspective view of an aspect of a chassis.

The devices, systems, modules, and methods for flow reactors will be understood from the accompanying drawings, taken in conjunction with the accompanying description. It is noted that, for purposes of illustrative clarity, certain elements in various drawings may not be drawn to scale. Several variations of the system are presented herein. It should be understood that various components, parts, and features of the different variations may be combined together and/or interchanged with one another, all of which are within the scope of the present application, even though not all variations and particular variations are shown in the drawings. It should also be understood that the mixing and matching of features, elements, and/or functions between various variations is expressly contemplated herein so that one of ordinary skill in the art would appreciate from this disclosure that the features, elements and/or functions of one variation may be incorporated into another variation as appropriate, unless described otherwise.

I. Reactor

One aspect of the present disclosure encompasses a continuous flow reactor comprising a chassis comprising a plurality of channels, reactor tubing installed in a channel of the chassis, and optionally a cover for partially and/or completely covering the chassis and the reactor tubing. Using the reactor tubing and a single chassis of the instant disclosure, the operator can quickly and straightforwardly re-configure a reactor using the same reactor parts to change the size and volume of the reactor, thereby providing flexibility in reactor volumes to suit reactions with different reaction times and kinetics. In instances where reactors of various volumes are needed but are restricted in overall size of the reactor, a chassis of a single size can be configured to provide reactors with multiple volumes, thereby providing reactors with single form factor for all reactor sizes. As described further below, one or more of the reactors of the present invention can be connected or associated with other devices used in a process for producing a chemical product, such as reservoirs, heaters, valves, flow meters, filter-washer-dryers, combination reactor filter washer dryer devices, waste reservoirs, separators, crystallizers, purification devices, pumps, inline mixers, pressure transducers, controllers, mixing chambers, tube style or plug-flow reactors, or any combination thereof. In some aspects, the reactors of the present invention can be used in miniature chemical or pharmaceutical manufacturing units, a pharmaceutical on demand (POD) unit, or a portable formulating apparatus where space and automation of a process are valued.

As used herein, the term "reactor size" refers to the size of the reactor portion of the instant reactor of the present invention. The size of the reactor portion includes such variables as the length and internal or external diameter of the reactor tubing, and the volume that the reactor tubing can accommodate in the reactor portion of the reactor.

Chassis of the instant disclosure comprise a plurality of channels of different lengths, each defining a tubing path into which a length of reactor tubing is placed to create the reactor portion of the flow reactor. The plurality of channels are of a fixed diameter, thereby allowing convenient and easy re-configuration of the reactor tubing of a different length by placing the reactor tubing in another channel of a different length to create a reactor portion having a longer or shorter length. Accordingly, each chassis of the instant disclosure can be used to change the size of the reactor by changing the channel in which the reactor tubing is installed to change the length of the reactor portion of the reactor and the internal diameter of the reactor tubing, both of which will change the reactor volume. Tubing length, internal diameter, and volume all can contribute to desired applications and reaction dynamics, and can be conveniently changed using a reactor of the instant disclosure. Further, size variables that can be changed in the modular reactor of the instant disclosure can be used to construct a specific type of flow reactor, including plug flow reactors, continuous flow reactors, and the like.

As further detailed below, the channels in the chassis are on a single surface of the chassis, making the tubing easily accessible for re-configuration. Surface channels also simplify the manufacturing process, when compared to manufacturing processes used for currently available reactors comprising inaccessible reactor tubing. For instance, a chassis of the instant disclosure can be manufactured using single-side machining, pressing, 3D printing, or injection molding. The single side channels and single form factor also allow for easy placement and removal of a cover, further contributing to the ease of assembly. Similarly, the single surface channels and single form factor provide the option of stacking multiple reactors of the same form, thereby providing even more flexibility in reactor configurations.

The plurality of channels on the surface of the chassis comprise a primary channel arranged in a double spiral configuration. The primary channel comprises a first spiral channel comprising a first end at a side or a surface of the chassis, and a second spiral channel comprising a second end at the side or a surface of the chassis (FIGS. 1-4 and 6). The first spiral channel and the second spiral channel are interleaved and connect at a center of the double spiral to form the primary channel extending from the first end, through the first and second spiral channels, to the second end. The primary channel defines a first reactor tubing path for a reactor tube with an inlet at the first end of the channel and an outlet at the second end of the channel.

The plurality of channels also comprise one or more secondary channels. All secondary channels comprise cross channels connecting cross channel ends at a side or a surface of the chassis to the primary channel at a connection point internal to the primary channel (FIGS. 1-4 and 6). More specifically, a secondary channel comprises a first cross channel connecting a first cross channel end at a side or a surface of the chassis to a connection point internal to the first spiral channel, and a second cross channel connecting a second cross channel end at a side or a surface of the chassis to a connection point internal to the second spiral channel. A secondary channel extends from the first cross channel end through the first and second spiral channels at the points of connection between the cross channels and the main channel, to the second cross channel end at the side or surface of the chassis. Each secondary channel defines a reactor tubing path for a reactor tube with an inlet at the first cross channel end and an outlet at the second cross channel end. Accordingly, a section of each secondary channel starting and ending at the connection points is shared with a section of the main channel. Therefore, all secondary channels can be shorter than the main channel. The length of a secondary channel is determined by the location on the primary channel at which cross channels of the secondary channel connect to the main channel. Accordingly, the length of each secondary channel can be selected by connecting cross channels of the secondary channel at appropriate connection points within the main channel. For instance, a secondary channel connecting to the main channel at a point distal relative to the center of the spiral is shorter than a secondary channel connecting to the main channel at a point distal relative to the center of the spiral. Advantageously, cross channels can connect to the main channel at any point in the main channel, thereby providing the opportunity to create secondary channels of any desired length.

Figure 2:
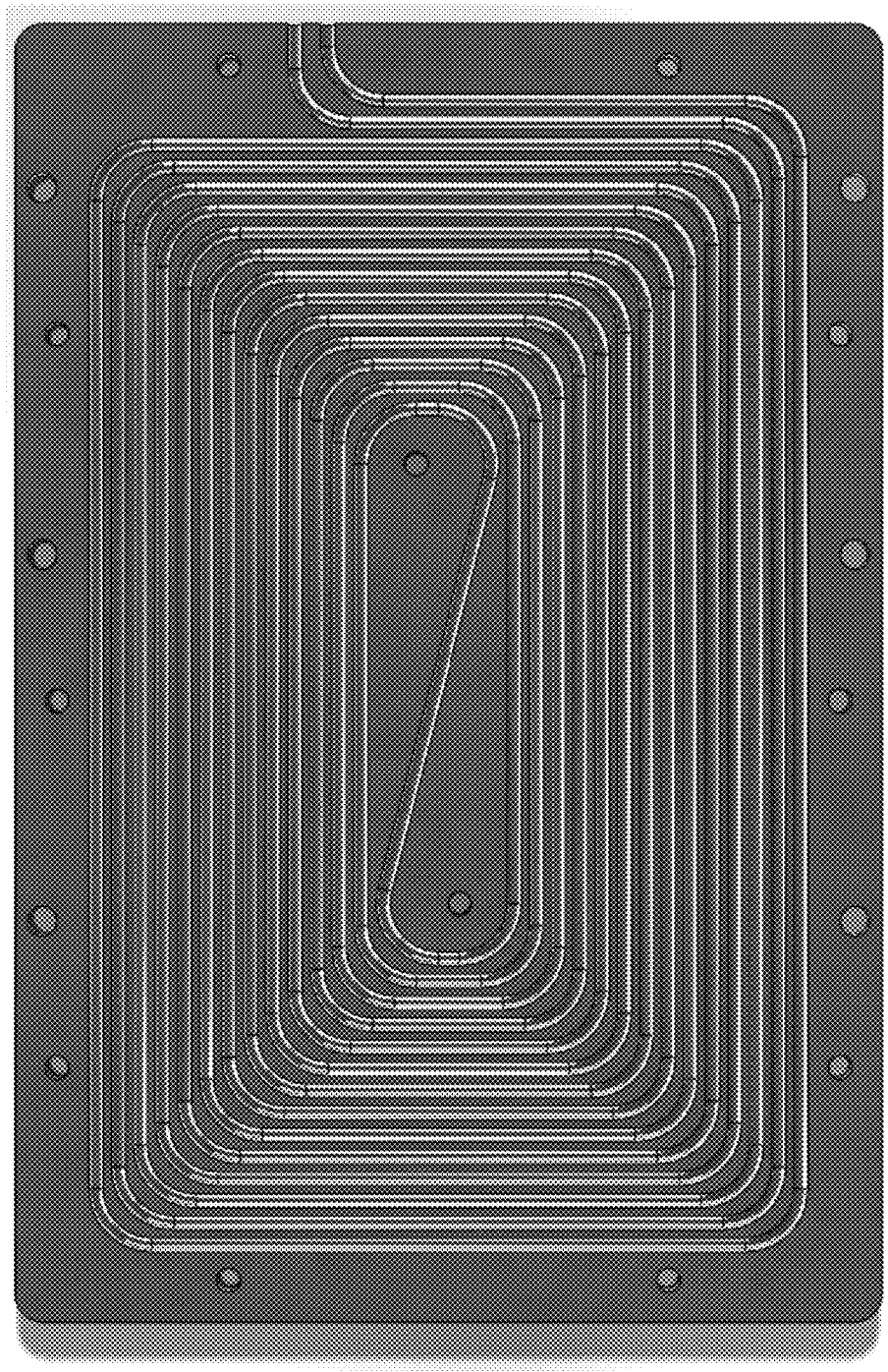
FIG. 2 is top perspective view of an aspect of a chassis.

Considering the double spiral configuration of the primary channel, a cross channel extending to a connection point within the primary channel will intersect the primary channel at each loop of the spiral. Accordingly, one set of cross channels can be shared by a number of secondary channels to prepare secondary channels of different sizes, by installing tubing in the cross channels and at each loop in the spiral. An aspect wherein a chassis comprises one set of cross channels shared by a number of secondary channels is depicted in FIG. 2. Alternatively, a chassis can comprise cross channels for each desired length of the cross channels. An aspect wherein a chassis comprises cross channels for each desired length of the cross channels is depicted in FIG. 1.

In some aspects, the channels can range from about 1 inch to about 500 inches in length, from about 1 inch to about 200 inches in length, from about 100 inches to about 600 inches in length, from about 10 inches to about 250 inches in length, from about 200 inches to about 500 inches in length, or from about 20 to about 250 inches in length. In some aspects, the channels can be 10, 20, 30, 40, 50, 60, 75, 80, 85, 90, 100, 110, 120, 130, 140, 150, 160, 170, 180, 190, or 200 inches in length.

In some aspects, the ends of the channels are at a surface of the chassis. In other aspects, the ends of the channels are at a side of the chassis. Any number of secondary channels can be included on the chassis, with the only limitation being the number of channel ends that could be accommodated on sides or surfaces of a chassis. For instance, the chassis can comprise a total of 2, 3, 4, 5, 6, 7, 8, 9, 10 or more channels. In some aspects, the chassis comprises 5 secondary channels in addition to the primary channel to provide a total of 6 channels. In other aspects, the chassis comprises 4 secondary channels in addition to the primary channel to provide a total of 5 channels.

The locations of inlets and outlets of tubing paths created by the channels on the side of the chassis relative to each other and relative to the chassis can and will vary based on the flow reactor and intended use of the flow reactor. For instance, a reactor can have all inlets on one side of the chassis and all outlets on another side of the chassis if the reactor is to be attached in line with other equipment. Alternatively, inlets and outlets can all be on one side of the chassis, for example, to attach the reactor to other equipment in tight spaces. The inlet and outlet of a tubing path can be adjacent to each other on the side of the chassis.

The variable volume continuous flow reactor of the instant disclosure is well suited for handling flammable, toxic, corrosive and odor-noxious materials, as the device provides product isolation, minimal operator exposure, reduced product handling, provides for very high solvent recovery, and provides environmental protection against solvent vaporization. Additionally, the level of containment supplied can comply with GMP and other health and safety requirements that companies often face. The reactor can be designed to operate under vacuum and/or pressure. For all of these reasons, the reactor can be used in pharmaceutical, fine chemical, dye and paint production, industrial chemical processes, and wastewater treatment applications.

As described further below, the reactor of the present invention can comprised in a collection of one or more chassis, one or more lengths of tubing, optionally one or more covers, and additional components for assembly into reactor modules of the instant disclosure. The additional components can be as described herein further below. The reactor or reactor modules can be connected or associated with other modules used in a process for producing a chemical product, such as reservoirs, heaters, valves, flow meters, filter-washer-dryers, combination reactor filter washer-dryer devices, waste reservoirs, separators, purification devices, pumps, inline mixers, pressure transducers, controllers, mixing chambers, tube style or plug-flow reactors, or any combination thereof.

A variable volume reactor of the instant disclosure can also comprise a temperature control device operable to control the temperature of the reaction medium. The temperature control device can control temperature by conductive, thermoelectric, resistance heating, impedance, temperature modulation using induction, microwave dielectric heating, and any combination thereof. Non-limiting examples of a temperature control device include heat exchanger plates or other heating elements on the exterior of and adjacent to the reactor, and jackets surrounding the reactor and/or vessel adapted to regulate the temperature of the reaction medium by providing sources of heating and cooling. In some aspects, the temperature control device is an in-line heat exchanger plate adjacent to the reactors. In these aspects, the heat exchanger plates are used both in a mechanical support capacity, in addition to providing heating and cooling. In these aspects, the reagents do not come into contact with the plate.

A channel generally has a cross-section size and shape complementary to the size and shape of the reactor tubing for efficient heat transfer between the chassis and the reactor portion of the reactor, and to provide secure placement of the tubing in the channel. Channels can be sufficiently deep to provide secure placement of reactor tubing in the channel without the need for a cover. For instance, the channel can also have a U-shaped cross section to provide secure placement of reactor tubing in the channel without the need for a cover. Alternatively, channels can have a depth equal to or shorter than the size of the diameter of the tubing. For instance, when the tubing has a circular cross section, the channel can have a semicircular cross section. In such aspects, the reactor can further comprise a cover, wherein a surface of the cover can also have semicircular channels corresponding to the channels of the chassis, such that when the cover is placed over the chassis, the tubing is enclosed in the resulting circular channel. The channels can be etched, molded, or machined into the surface of the chassis or can be manufactured on the surface to have channel sides extending from the surface of the chassis. In some aspects, the channels are manufactured in the side of the chassis.

The reactor of the instant disclosure can further comprise a cover to partially or completely cover the surface of the chassis comprising the channels. A surface of the cover contacting the surface of the chassis having the channels can be flat. Alternatively, a surface of the cover can include channels corresponding to the channels of the chassis, such that when the cover is placed over the chassis, the tubing is enclosed in the resulting circular channel as explained above.

The cover can be releasably fastened to the chassis by a mechanical closure. Suitable mechanical closures are known in the art and generally comprise a means of engaging the cover and the chassis to bring the cover and the chassis into contact with each other and securely fasten the cover and the chassis. Mechanical closures include those normally used in applications where purity, contamination, and cleanability are of paramount importance such as in the pharmaceutical industry, food industry, and the like. Non-limiting examples of mechanical closures include a sanitary clamp or other suitable union such as clamps or unions of conventional design, including band clamps, Velcro, magnets, sanitary clamps such as Ladish, Tri-Clover clamps, Tri-Clamps, S-Clamps, 3A pipe fittings, a notch, a groove, a hook and loop fastener, mated threads on the vessel top or base and the vessel walls, nuts and bolts, clips, or any combination thereof.

In some aspects, the means for fastening the cover to the chassis is any means of attachment that allows for simple but secure placement of the cover on the chassis to further contribute to the ease of assembly of the reactor. In some aspects, the means for securing the cover to the chassis comprises magnets on both the cover and chassis. In other aspects, the means for securing is a "snap on" closure to snap on and pry off the cover onto and off the chassis. In other aspects, the means for securing is a friction fit closure. In some aspects, the means for securing the cover to the chassis comprises complementary wedges and grooves on the chassis and the cover for sliding the cover into position. For instance, the means for securing can be complementary wedges on both the chassis and the cover, or a wedge on the cover or chassis and a complementary wedge or notch on the chassis or cover. In some aspects, the means for securing comprises a wedge on the cover and a complementary notch on the chassis. In some aspects, the chassis can comprise nuts pressed into a space in the chassis and holes in the cover located over the nuts where a screw type fastener can be inserted and the cover secured. It will be recognized that one or more closures or types of closure can be used as a means for securing the cover to the chassis.

Seals, gaskets, and O-rings can also be designed and used to ensure a tight seal between the cover and chassis. The material of the seals, gaskets, O-rings, or any combination thereof is generally inert to the reaction medium. For instance, the material can be elastomers, neoprene, EPDM rubber (ethylene propylene diene monomer rubber), coated elastomers such as fluoropolymer-coated elastomeric gaskets, such as PTFE-coated Viton™, and silicone encapsulated with fluorinated ethylene propylene (FEP) or a perfluoroelastomer such as Kalrez™. Other means of ensuring a fluid-tight seal between the cover and sealing rim can be envisioned.

The size and shape of a reactor can and will vary depending on the intended function of the reactor and equipment with which the reactor is used. As flow reactors can have uses in diverse fields such as within the food, chemical, and pharmaceutical industries, the size of a reactor can and will vary considerably to provide a volume of about 1 ml to about 4 L ml. A reactor can have two or more channels, wherein tubing placed in the channels can provide a volume ranging from about 1 mL to about 20 mL, from about 1 mL to about 100 mL, from about 1 mL to about 200 mL, from about 1 mL to about 500 mL, from about 1 mL to about 50 mL, from about 2 mL to about 15 mL, from about 10 mL to about 20 mL, from about 1 mL to about 10 mL, or from about 3 mL to about 16 mL. In some aspects, the reactor comprises six channels wherein tubing placed in each channel provides a volume of about 3.1, 4.9, 6.9, 9.3, 12.1, and 15.4 mL. In some aspects, the reactor comprises six channels wherein tubing placed in each channel provides a volume of about 3.1, 4.9, 6.9, 9.3, 12.1, and 15.4 mL, and wherein the tubing comprises an outer diameter of about ³⁄₁₆" and an internal diameter of about ⅛".

Tubing placed in the channels of a reactor of the instant disclosure can also provide a volume ranging from less than about 100 mL to about 5 L or more. For instance, the tubing can provide a volume ranging from about 100 mL to about 5 L or more, from about 500 mL to about 5 L or more, from about 1 L to about 5 L or more, from about 2 L to about 5

L or more, from about 3 L to about 5 L or more, or from about 4 L to about 5 L or more. Tubing can also provide a volume ranging from about 100 mL or less to about 5 L, from about 100 mL or less to about 5.5 L, from about 100 mL or less to about 4.5 L, from about 100 mL or less to about 4 L, from about 100 mL or less to about 3.5 L, from about 100 mL or less to about 3 L, from about 100 mL or less to about 2.5 L, from about 100 mL or less to about 2 L, from about 100 mL or less to about 1.5 L, from about 100 mL or less to about 1 L, or from about 100 mL or less to about 500 mL. Tubing can also provide a volume ranging from about 500 mL to about 4.5 L, from about 1 L to about 4 L, from about 1.5 L to about 3.5 L, or a volume of about 2 L. In some aspects, the reactor comprises six channels wherein tubing placed in each channel provides a volume of about 1, 1.5, 2, 2.5, and about 3 L. Table 1 below shows non-limiting examples of volumes and dimensions of tubing for obtaining reactors having volumes ranging from about 60 mL to about 2 L.

TABLE 1

| Target reactor volume, ml | 60 | 2000 | 2000 | 2000 | 2000 |
|---|---|---|---|---|---|
| Target reactor volume, in3 | 3.66 | 122.05 | 122.05 | 122.05 | 122.05 |
| Tubing ID, inches | 0.125 | 0.125 | 0.25 | 0.375 | 0.5 |
| cross-sectional area, in2 | 0.012 | 0.012 | 0.049 | 0.110 | 0.196 |
| required length, inches | 298.4 | 9945.4 | 2486.3 | 1105.0 | 621.6 |
| required length, feet | 24.9 | 828.8 | 207.2 | 92.1 | 51.8 |

Further, as the reactors of the instant disclosure can accommodate reactors that can provide variable volumes in a single form factor, the reactor volume can be adjusted not only by changing the length of the channels, but also by having reactors of the same form factor having varying channel sizes to accommodate larger reactor volumes.

The chassis, the reactor tubing, and the cover can be manufactured from material suitable for the intended function of the reactor. Such materials are well known to those of skill in the art, including for example, stainless steel, aluminum, steel alloys, and other materials suitable for use in pharmaceutical grade manufacturing. For example, tubing material suitable for a tube reactor generally includes a chemically inert material, such as chemically inert polymers including inert fluoropolymers like polytetrafluoroethylene (PTFE), ethylene-tetrafluoroethylene (ETFE) or perfluoroalkoxy copolymer PCTFE (polychlorotrifluoroethylene), ECTFE (polyethylenechlorotrifluoroethylene), PFA or MFA (perfluoroalkoxy polymer; Teflon™) polyetheretherketone (PEEK), fluoropolymers such as PVF (polyvinylfluoride), PVDF (polyvinylidene fluoride), FFPM/FFKM (Perfluorinated Elastomer [Perfluoroelastomer]), FPM/FKM (Fluoroelastomer [Vinylidene Fluoride based copolymers]), FEPM (Fluoroelastomer [Tetrafluoroethylene-Propylene]), PFPE (Perfluoropolyether), Perfluoropolyoxetane, fluorinated ethylene propylene (FEP), or any combination thereof.

Further, the chassis and the cover can be constructed of the same or different materials based on the intended use of the reactor. Non-limiting examples of materials include metals, including but not limited to steel, metal alloys such as Hastelloy™ and Inconel™, stainless steel, aluminum, glass, as well as plastics such as polyetheretherketone (PEEK), ceramics, polytetrafluoroethylene (PTFE), and fluoropolymers such as PVF (polyvinylfluoride), PVDF (polyvinylidene fluoride), PTFE (polytetrafluoroethylene), PCTFE (polychlorotrifluoroethylene), PFA or MFA (perfluoroalkoxy polymer; Teflon™), FEP (fluorinated ethylene-propylene), ETFE (polyethylenetetrafluoroethylene), ECTFE (polyethylenechlorotrifluoroethylene), FFPM/FFKM (Perfluorinated Elastomer [Perfluoroelastomer]), FPM/FKM (Fluoroelastomer [Vinylidene Fluoride based copolymers]), FEPM (Fluoroelastomer [Tetrafluoroethylene-Propylene]), PFPE (Perfluoropolyether), Perfluoropolyoxetane, or any combination thereof. In some aspects, it could be beneficial to construct the components from, or comprise portions made of thermally conductive material or material that can withstand pressures that may accumulate in the process chamber.

The chassis, the cover, or both can be constructed of the same or different material based on the intended use of the reactor. For instance, a reactor chassis, a cover, or both, can be constructed of plastics, metals, and the like, provided the material can contribute to the intended function of the reactor. For instance, it could be beneficial to construct the chassis, cover, or both from, or comprise portions made of thermally conductive material such as metals, including but not limited to aluminum, as well as ceramics and glass, for efficient control of reaction temperature. Similarly, a reactor chassis, cover, or both, can be constructed from or can comprise portions made of translucent/transparent material for observation during the reaction process, and/or to allow the user to direct specific electromagnetic energy at a specific wavelength into the reactor portion to participate in the reaction process. An example of electromagnetic energy can be UV light to help catalyze a polymerization reaction. It will be recognized that the reactor can further comprise additional components or parts known to individuals of skill in the art suitable for the intended function of the reactor. For instance, the flow reactor can have measurement regions that can accommodate one or more detectors, or one or more conductive areas having different conductive properties. Non-limiting examples of detectors include a camera, an optical microscope, an electron microscope, a spectrometer, or combinations thereof.

The reactor of the instant disclosure can further comprise other components such as sensors, filters, connectors, probes, samplers, or connectors for attaching the reactor to additional devices or systems. In some aspects, the reactor comprises connectors for attaching the reactor to a miniature chemical or pharmaceutical manufacturing unit, a pharmaceutical on demand (POD) unit, or a portable formulating apparatus.

Non-limiting examples of sensors that may be used in conjunction with reactors of the instant invention include sensors for fluid flow, temperature, pH, oxygen, pressure, concentration, and sensors that can detect specific compounds in a reaction medium. Fluid flow sensors can sense the rate of reagent or solvent addition which can be adjusted in an adaptive response to real time, or near real time, touchless measurements. Other devices can include pressure relief or other valves such as rupture disks, connectors such as Luer connectors, compression fittings, quick disconnects, aseptic G sterile connectors and other such fitting that would allow for the creation of sterile connections, septums for sampling, filters, bearings such as agitator shaft bearings and bearing assemblies, viewports, and probe ports. Reactors of the instant disclosure can also comprise devices such as light emitting diodes (LEDs) that direct specific electromagnetic energy at a specific wavelength into the reactor portion to participate in the reaction process. Such devices can direct the energy through portions in the vessel made of translucent/transparent material. Alternatively, electromagnetic energy devices can be embedded into the side walls of the vessel.

The reactors can further comprise contact or contactless measuring systems, which may comprise instruments operable to measure, for example, quantity (i.e., volume, weight, etc.), analyte identity and/or concentration, flow rate, temperature, pressure, turbidly, color, reagent use, reagent verification, and product verification. The measurement of the reactants or reaction in the process chamber may be performed using spectroscopic analysis, ultrasonic detection, or optical detection. Reagent verification, product verification, analyte identity, and concentration analysis within the process chamber may be performed using a range of analytical instruments, such as liquid chromatography (LC), MS high performance liquid chromatography (HPLC) with or without UV-VIS, UV-VIS-DAD and/or mass spectrometry detectors, electromagnetic radiation spectroscopy, such as UV/Vis NIRF, FTIR, and RAMAN, and combinations thereof.

The reactor can further comprise measuring devices for tracking fluid volume and/or flow rate within the reactor using ultrasound or camera and machine vision. Ultrasonic fluid level measurement may be performed, for example, using GL Sciences Liquid Level Sensor Reservoir Accessories. Non-limiting examples of suitable ultrasonic flow rate sensors include SonoFlow® CO.55 | Ultrasonic Clamp-On. Liquid volume and flow rate tracking may also be monitored using computer vision and pre-trained instance segmentation computer neural network (CNN). Using this method, the current volume in a transparent reactor using a contactless measurement system may be monitored by computer vision based on the pixel area of liquid to vessel. Computer vision may be used to track the fill line of the liquid contents of a transparent or translucent reactor.

In some aspects, the temperature in the reactor of the instant disclosure may be monitored using a touchless temperature sensor. Non-limiting examples of suitable touchless temperature sensors include infrared temperature sensors. Exemplary commercially available temperature sensors include Melexis Technologies NV part number MLX90614KSF-ACC-000-TU-ND.

A reactor of the instant disclosure can also comprise a temperature control device operable to control the temperature of the reaction medium. The temperature control device can control temperature by conductive, thermoelectric, resistance heating, impedance, temperature modulation using induction, microwave dielectric heating, and any combination thereof. Non-limiting examples of a temperature control device include heat exchanger plates or other heating elements on the exterior of the reactor, heating elements in the reaction space, and jackets surrounding the reactor and/or vessel adapted to regulate the temperature of the reaction medium by providing sources of heating and cooling. In some aspects, the temperature control device is an induction coil, an induction coil support in the vessel base, and a thermistor in the vessel base. In some aspects, the temperature control device is a copper induction coil, an induction coil support in the vessel base, and a HasteHoy™ C276 thermistor in the vessel base.

The reactor can further comprise a controller in functional communication with components of the reactor, and components attached to the reactor such as valves and sensors, and is operable to provide tight control of the operational sequence of the process on parameters such as temperature and pH. For instance, in some aspects, a controller can perform one or more of the following functions: allow switching on or off components of the system such as a fluid discharge valve, reaction medium inlet valve, provide controls for system function such as speed of fluid movement, and provide monitoring information using data collected by the sensors. The controller can include additional input and output components that permit input by a user (e.g., a touch screen display, a keyboard, a keypad, a mouse, a button, a switch, a microphone, etc.). The controller can also include output components that provide output information (e.g., a display, a speaker, one or more light-emitting diodes (LEDs), etc.).

In addition to the controller, the reactor can further comprise at least one processor and associated memory adapted to receive the operational and sensor data from the controller. The processor and associated memory can be hard wired to the system or can be networked in a wired or wireless manner. The processor and associated memory can also communicate with a server or other remote computing device in order to execute specific steps. A non-transitory computer readable medium programmed to execute the methods can be loaded on the processor and associated memory or in communication with the system. In some aspects, the processor can be operable to assign one or more event times, wherein each event time indicates the time of a change in the state of a signal received from a component of the system or a sensor. In this aspect, the associated memory can be operable to receive and store the signals and/or outputs of the sensors of the device, and the one or more event times. The storage component may store information and/or software related to the operation and use of the controller. The storage component can include a random-access memory (RAM), a read only memory (ROM), and/or another type of dynamic or static storage device (e.g., a flash memory, a magnetic memory, an optical memory, etc.) that stores information and/or instructions for use by the controller.

In some aspects, it is contemplated that the processor can comprise an alarm system that can be activated in response to one or more inputs from a sensor. In these aspects, it is contemplated that the alarm system can comprise a conventional device for selectively generating optical, thermal, vibrational, and/or audible alarm signals.

In some aspects, when the reactor is attached to and used in conjunction with a POD unit operable for production of a pharmaceutical, the controller can be adapted to communicate data with at least one processor and associated memory of the POD unit. For instance, the controller can be operable to communicate a signal to the processor and memory of the POD unit in response to sensor data indicating moisture level in the filter cake. In such instance, the POD unit can switch off the pressure and/or vacuum input in response to a signal received from the treatment system controller, indicating a desired moisture level is reached.

II. Methods of Use

The instant disclosure is also directed to a method of manufacturing a compound using a variable volume flow reactor to perform a chemical reaction within the reactor in a process of manufacturing the compound. The variable volume reactor can be as described in Section I herein above.

The chemical reaction can be reactions for producing a chemical compound, a biological compound, an active pharmaceutical compound (API), and a formulated drug product using this reactor. In some aspects, the chemical reactant can be an active pharmaceutical ingredient. In some aspects, the chemical reactant can be a precursor of an active pharmaceutical ingredient.

In some aspects, a method of synthesizing a chemical compound comprises providing or having provided one or more input materials, transporting the one or more input materials through a continuous flow reactor in a reactor input stream, and subjecting the one or more input materials in the reactor to conditions that allow or promote a chemical reaction between the input materials. Materials output from the reactor in a reactor output stream comprise the synthesized chemical compound as well as unreacted precursors, and side reactants.

Chemical reagents, solvents, and other variables necessary for synthesizing a compound can and will vary depending on the compound and the method of synthesis used to synthesize the compound. Any suitable chemical reagent can be used in the systems and methods described herein. Generally, the type of reagent that is employed in the system will depend on the chemical product of interest.

Chemical reactants and/or chemical products can be transported into and/or out of the variable volume reactor in any suitable form. In certain aspects, one or more of the chemical reactants and/or chemical products transported through the reactor are in the form of one or more solutes. In certain aspects, the solute (e.g., the chemical reactant and/or the chemical solvent) may be present at a relatively high concentration. For example, in some aspects, a chemical reactant and/or a chemical product may be present at a concentration of greater than or equal to about 1 M. In certain aspects, a chemical reactant and/or a chemical product may be present in an amount close to the saturation limit (e.g., within 90%, within 95%, or within 99% of the saturation limit) of the chemical reactant and/or of the chemical product. As will be understood by those skilled in the art, the saturation limit generally refers to the concentration of a solute before the solute begins to precipitate from solution (i.e., form a solid phase of the solute). Several advantages of using fluids comprising a high concentration of solutes include increasing productivity and/or processed materials rates and reducing waste and formation of byproducts.

In certain aspects, any of the methods for the production of a chemical product (e.g., an ingestible pharmaceutical composition) described herein can be continuous processes using the variable volume reactor of the instant disclosure as one module in a complete system. In some aspects, the method for the continuous production of the chemical product (e.g., the ingestible pharmaceutical composition) comprises transporting an input fluid comprising a chemical reactant through one or more reactors. In certain aspects, a chemical reactant is reacted within the reactor to produce the solid chemical product (e.g., an API). Continuous systems that include two or more modules (e.g., reactors, separators, and the like) can be arranged such that transport between the modules within the continuous system occurs during at least a portion of the time during which the modules are performing their intended function (e.g., reaction for a reactor, filtering for filter washer-dryer device, etc.).

In some aspects, a chemical product is produced continuously from one or more precursors of the chemical product when precursors of the chemical product are being transported into the continuous system and chemical product is being transported out of the continuous system, during at least portions of the times the components of the continuous system are being operated to produce the finished chemical product. Methods of using continuous flow reactors to perform chemical reactions are well known in the art. In general, chemical reactions in a continuous flow reactor take place in a continuous manner, as described below.

The conditions prevailing within the reactor of the instant disclosure can be judiciously selected, controlled, and/or maintained, suitably by controlling one or more reaction parameters (e.g., temperature, pressure, residence time, mixing). The reactor may be operated to induce, adjust, and/or maintain one or more reaction parameters within the reactor. For instance, where the reactor comprises or is associated with a heating or cooling device, the temperature within the reactor (and therefore of the reaction mixture) may be selected, maintained, or adjusted—it may be particularly important to apply cooling or otherwise allow heat-exchange to remove heat generated during a reaction by exotherms. Where the reactor comprises or is associated with a pressure adjusting device (e.g., a vacuum pump or autoclave), the pressure (or lack thereof) within the reactor (and therefore of the reaction mixture) may be selected, maintained, or adjusted. Where the reactor is configured to receive input from one or more input flow lines, prevailing reaction conditions (e.g., pH) within the reactor (and therefore of the reaction mixture) may be selected, maintained, or adjusted.

In some aspects, the reactor of the present invention is used in connection with miniature chemical or pharmaceutical manufacturing units, or pharmaceutical on demand (POD) units. POD units are comprised of a number of individual production modules that interact with one another in order to perform one or more steps in a chemical production process. In some aspects, the POD units are sufficiently small such that they are suitable for manufacturing pharmaceuticals or finished drug products which are to be directly distributed and/or deployed to pharmacies, hospitals and to consumers, rather than depend on pharmaceuticals from a large manufacturing plant.

According to certain aspects, certain of the systems and methods described herein can be used to produce an ingestible pharmaceutical composition. A method for the production of an ingestible pharmaceutical composition may comprise, in some aspects, transporting an input fluid comprising a chemical reactant through a reactor module via a conduit such that the chemical reactant is reacted within the reactor to produce an active pharmaceutical ingredient within a reactor output stream.

In some aspects, the fluid transported into the reactor of the present invention, as described above, comprises a solvent. Solvents can be aprotic solvents, protic solvents, organic solvents, and any combination thereof. Non-limiting examples of suitable aprotic solvents include acetone, acetonitrile, diethoxymethane, N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMAC), 1,4-dioxane, N-methyl-2-pyrrolidinone (NMP), ethyl acetate, ethyl formate, ethyl methyl ketone, formamide, hexachloroacetone, hexamethylphosphoramide, methyl acetate, N-methylacetamide, N-methylformamide, methylene chloride, nitrobenzene, nitromethane, propionitrile, sulfolane, tetramethylurea, tetrahydrofuran (THF), 2-methyl tetrahydrofuran, trichloromethane, and combinations thereof. Suitable examples of protic solvents include, but are not limited to, methanol, ethanol, isopropanol, n-propanol, isobutanol, n-butanol, s-butanol, t-butanol, formic acid, acetic acid, water, and combinations thereof. Suitable organic solvents include, but are not limited to, alkane and substituted alkane solvents (including cycloalkanes), aromatic hydrocarbons, esters, ethers, ketones, combinations thereof, and the like and any combination thereof. Organic solvents that may be employed include, for example, acetonitrile, benzene, butyl acetate, t-butyl methylether, t-butyl methylketone, chlorobenzene, chloroform, chloromethane, cyclohexane, dichloromethane, dichloroethane, diethyl ether, ethyl acetate, diethylene glycol, fluorobenzene, heptane, hexane, isobutylmethylketone, isopropyl acetate, methylethylketone, methyltetrahydrofuran, pentyl acetate, n-propyl acetate, tetrahydrofuran, toluene, and any combination thereof.

As described above, the reactor of the present invention can be used to synthesize an active pharmaceutical ingredient ("API"). As used herein, the term "active pharmaceutical ingredient" (also referred to as a "drug") refers to an agent that is administered to a subject to treat a disease, disorder, or other clinically recognized condition, or for prophylactic purposes, and has a clinically significant effect on the body of the subject to treat and/or prevent the disease, disorder, or condition. Active pharmaceutical ingredients include, for example, without limitation, agents listed in the United States Pharmacopeia (USP). In some aspects, the active pharmaceutical ingredient is one that has already been deemed safe and effective for use in humans or animals by the appropriate governmental agency or regulatory body. For example, drugs approved for human use are listed by the FDA under 21 C.F.R. §§ 330.5, 331 through 361, and 440 through 460, incorporated herein by reference; drugs for veterinary use are listed by the FDA under 21 C.F.R. §§ 500 through 589, incorporated herein by reference. All listed drugs are considered acceptable for use in accordance with the present invention.

In certain aspects, the active pharmaceutical ingredient is a small molecule. Exemplary active pharmaceutical ingredients include, but are not limited to, adrenergic blocking agents, anabolic agents, androgenic steroids, antacids, anti-asthmatic agents, anti-allergenic materials, anti-cholesterolemic and anti-lipid agents, anti-cholinergics and sympathomimetics, anti-coagulants, anti-convulsants, anti-diarrheal, anti-emetics, anti-hypertensive agents, anti-infective agents, anti-inflammatory agents such as steroids, non-steroidal anti-inflammatory agents, antimalarials, anti-manic agents, anti-nauseants, anti-neoplastic agents, anti-obesity agents, anti-parkinsonian agents, anti-pyretic and analgesic agents, anti-spasmodic agents, anti-thrombotic agents, anti-uricemic agents, anti-anginal agents, antihistamines, anti-tussives, appetite suppressants, benzophenanthridine alkaloids, biologicals, cardioactive agents, cerebral dilators, coronary dilators, decongestants, diuretics, diagnostic agents, erythropoietic agents, estrogens, expectorants, gastrointestinal sedatives, agents, hyperglycemic agents, hypnotics, hypoglycemic agents, ion exchange resins, laxatives, mineral supplements, mitotics, mucolytic agents, growth factors, neuromuscular drugs, nutritional substances, peripheral vasodilators, progestational agents, prostaglandins, psychic energizers, psychotropics, sedatives, stimulants, thyroid and anti-thyroid agents, tranquilizers, uterine relaxants, vitamins, antigenic materials, and prodrugs, etc. Non-limiting examples of APIs include propofol, midazolam, cisatracurium, ciprofloaxin, and others.

As used herein, the term "small molecule" refers to molecules, whether naturally occurring or artificially created (e.g., via chemical synthesis) that have a relatively low molecular weight. Typically, a small molecule is an organic compound (i.e., it contains carbon). The small molecule may contain multiple carbon-carbon bonds, stereocenters, and other functional groups (e.g., amines, hydroxyl, carbonyls, and heterocyclic rings, etc.). In certain aspects, the molecular weight of a small molecule is at most about 1,000 g/mol, at most about 900 g/mol, at most about 800 g/mol, at most about 700 g/mol, at most about 600 g/mol, at most about 500 g/mol, at most about 400 g/mol, at most about 300 g/mol, at most about 200 g/mol, or at most about 100 g/mol. In certain aspects, the molecular weight of a small molecule is at least about 100 g/mol, at least about 200 g/mol, at least about 300 g/mol, at least about 400 g/mol, at least about 500 g/mol, at least about 600 g/mol, at least about 700 g/mol, at least about 800 g/mol, or at least about 900 g/mol, or at least about 1,000 g/mol. Combinations of the above ranges (e.g., at least about 200 g/mol and at most about 500 g/mol) are also possible.

Also as noted above, the reactor can be used with modular systems, and the methods described herein can be used to produce ingestible pharmaceutical compositions. Generally, ingestible pharmaceutical compositions refer to those compositions including an active pharmaceutical ingredient and a pharmaceutically acceptable excipient. As used herein, the term "pharmaceutically acceptable excipient" means a non-toxic, inert solid, semi-solid or liquid filler, diluent, encapsulating material or formulation auxiliary of any type. Some non-limiting examples of materials which can serve as pharmaceutically acceptable excipients are sugars such as lactose, glucose, and sucrose; starches such as corn starch and potato starch; cellulose and its derivatives such as sodium carboxymethyl cellulose, methylcellulose, hydroxypropylmethylcellulose, ethyl cellulose, and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols such as propylene glycol; esters such as ethyl oleate and ethyl laurate; agar; detergents such as Tween 80; buffering agents such as magnesium hydroxide and aluminum hydroxide; alginic acid; water (e.g., pyrogen free water); isotonic saline; citric acid, acetate salts, Ringer's solution; ethyl alcohol; and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

The reactor can also be used with modular systems and the methods described herein to produce pharmaceutical compositions for parenteral administration (including subcutaneous, intradermal, intravenous, intramuscular, and intraperitoneal). Formulations for parenteral administration can be an aqueous or an oil-based solution. Aqueous solutions may include a sterile diluent such as water, saline solution, a pharmaceutically acceptable polyol such as glycerol, propylene glycol, or other synthetic solvents; an antibacterial and/or antifungal agent such as benzyl alcohol, methyl paraben, chlorobutanol, phenol, thimerosal, and the like; an antioxidant such as ascorbic acid or sodium bisulfite; a chelating agent such as etheylenediaminetetraacetic acid; a buffer such as acetate, citrate, or phosphate; and/or an agent for the adjustment of tonicity such as sodium chloride, dextrose, or a polyalcohol such as mannitol or sorbitol. The pH of the aqueous solution may be adjusted with acids or bases such as hydrochloric acid or sodium hydroxide. Oil-based solutions or suspensions may further comprise sesame, peanut, olive oil, or mineral oil.

In accordance with some aspects, the reactors described herein can be used in conjunction with other modules performing the same or different chemical processes or unit operations to produce chemical products. Some aspects comprise transporting a fluid (e.g., a chemical reagent, a solvent, or combinations thereof) through the one or more modules fluidically connected in series or in parallel, or combinations thereof. Some aspects comprise transporting a first fluid (e.g., a chemical reagent, a solvent, or combinations thereof) through a first module and a second module fluidically connected to the first module to form a first chemical product (which is output from the second module). Non-limiting examples of modules comprising chemical unit operations include, but are not limited to heaters, valves, flow meters, waste reservoirs, separators, crystallizers, pumps, inline mixers, pressure transducers, controllers, and any combination thereof. The one or more of the input materials can be a product of a chemical reaction conducted in a second reactor fluidically connected with the reactor of the instant disclosure.

Chemical reagents, solvents, and other variables necessary for synthesizing a compound can and will vary depending on the compound and the method of synthesis used to synthesize the compound. Any suitable chemical reagent can be used in the systems and methods described herein. Generally, the type of reagent that is employed in the system will depend on the chemical product of interest.

Chemical reactants and/or chemical products can be transported into and/or out of the reactor(s) in any suitable liquid form. In certain aspects, one or more of the chemical reactants and/or chemical products transported through the reactors is in the form of one or more solutes. In certain aspects, the solute (e.g., the chemical reactant and/or the chemical product) may be present at a relatively high concentration. For example, in some aspects, a chemical reactant and/or a chemical product may be present at a concentration of greater than or equal to about 1 M. In certain aspects, a chemical reactant and/or a chemical product may be present in an amount close to the saturation limit (e.g., within 90%, within 95%, or within 99% of the saturation limit) of the chemical reactant and/or of the chemical product. As will be understood by those skilled in the art, the saturation limit generally refers to the concentration of a solute before the solute begins to precipitate from solution (i.e., form a solid phase of the solute). Several advantages of using fluids comprising a high concentration of solutes, as compared to batch processes where dilute solutes are dissolved and/or suspended in a carrier fluid, include increasing productivity and/or processed materials rates and reducing waste and formation of byproducts (e.g., solid precipitates).

In certain aspects, any of the methods for the production of a chemical product (e.g., an ingestible pharmaceutical composition) described herein can be continuous processes using the reactor as one module in a complete system. In some aspects, the method for the continuous production of the chemical product (e.g., the ingestible pharmaceutical composition) comprises transporting an input fluid comprising a chemical reactant through one or more reactors of the present invention. In certain aspects, a chemical reactant is reacted, within the reactor, to produce the chemical product (e.g., an API) within the reactor output stream.

Continuous processes generally refer to systems in which precursor enters the system, product exits the system, and the transformation the system is designed to achieve all occur during at least a portion of the time during which the transformation occurs. As one example, in a continuous reactor system, reaction precursor enters the reactor and reaction product exits the reactor during at least a portion of the time that the chemical reaction within the reactor is taking place.

Continuous systems that include two or more modules (e.g., reactors, separators, and the like) can be arranged such that transport between the module within the continuous system occurs during at least a portion of the time during which the modules are performing their intended function (e.g., reaction for a reactor, separation for a separator, etc.).

In some aspects, a chemical product is produced continuously from one or more precursors of the chemical product when precursors of the chemical product are being transported into the continuous system and chemical product is being transported out of the continuous system during at least portions of the times the components of the continuous system are being operated to produce the finished chemical product. The conditions prevailing within the internal reactor can be judiciously selected, controlled, and/or maintained, suitably by controlling one or more reaction parameters (e.g., temperature, pressure, residence time, mixing). The dimensions and shape of the internal reactor may be optionally adjustable to control one or more reaction parameters. A variable volume reactor of the instant disclosure greatly facilitates this process. The internal reactor may be (optionally adjustably) dimensioned and/or shaped to provide a desired reaction mixture "residence time" (i.e., the volumetric residence time of the reaction mixture, which is the ratio of the reactor's internal volume and the overall volumetric flow rate of the reaction mixture through the reactor—i.e., where overall volumetric flow rate is suitably the sum of the flow rates of the first and second input loads). Naturally, this "residence time" may also be influenced by the overall flow rate, which may be altered by adjusting the flow rate of the individual input loads. In this context, "residence time" is generally a measure of the duration of reaction within the internal reactor (i.e., the time taken for a given volume of reaction mixture to pass through the reactor). In some aspects, the chemical reaction may take place at a particular volumetric flow rate throughout the reactor. In certain aspects, the flow rate is a variable flow rate. In some aspects, the flow rate is a constant flow rate. In some aspects, the chemical reaction takes place within a reactor at a flow rate ranging between about $1 \times 10^{-8}$ $m^3$/hr to about $1 \times 10^{-4}$ $m^3$/hr. In certain aspects, the chemical reaction takes place within a reactor at a flow rate of at least about $1 \times 10^{-8}$ $m^3$/hr, at least about $1 \times 10^{-7}$ $m^3$/hr, at least about $1 \times 10^{-6}$ $m^3$/hr, or at least about $1 \times 10^{-5}$ $m^3$/hr. Other flow rates are also possible.

The reactor may be operated to induce, adjust, and/or maintain one or more reaction parameters within the internal reactor. For instance, where the reactor comprises or is associated with a heating or cooling device, the temperature within the internal reactor (and therefore of the reaction mixture) may be selected, maintained, or adjusted—it may be particularly important to apply cooling or otherwise allow heat-exchange to remove heat generated during a reaction by exotherms. Where the reactor comprises or is associated with a pressure adjusting device (e.g., a vacuum pump or autoclave), the pressure (or lack thereof) within the internal reactor (and therefore of the reaction mixture) may be selected, maintained, or adjusted. Where the reactor is configured to receive input from one or more further input flow lines, prevailing reaction conditions (e.g., pH) within the internal reactor (and therefore of the reaction mixture) may be selected, maintained, or adjusted.

In some aspects, the fluid transported into the reactor of the present invention, as described above, comprises a solvent. Solvents can be aprotic solvents, protic solvents, organic solvents, and any combination thereof. Non-limiting examples of suitable aprotic solvents include acetone, acetonitrile, diethoxymethane, N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMAC), 1,4-dioxane, N-methyl-2-pyrrolidinone (NMP), ethyl acetate, ethyl formate, ethyl methyl ketone, formamide, hexachloroacetone, hexamethylphosphoramide, methyl acetate, N-methylacetamide, N-methylformamide, methylene chloride, nitrobenzene, nitromethane, propionitrile, sulfolane, tetramethylurea, tetrahydrofuran (THF), 2-methyl tetrahydrofuran, trichloromethane, and combinations thereof. Suitable examples of protic solvents include, but are not limited to, methanol, ethanol, isopropanol, n-propanol, isobutanol, n-butanol, s-butanol, t-butanol, formic acid, acetic acid, water, and combinations thereof. Suitable organic solvents include, but are not limited to, alkane and substituted alkane solvents (including cycloalkanes), aromatic hydrocarbons, esters, ethers, ketones, combinations thereof, and the like and any combination thereof. Organic solvents that may be employed, include, for example, acetonitrile, benzene, butyl acetate, t-butyl methylether, t-butyl methylketone, chlorobenzene, chloroform, chloromethane, cyclohexane, dichloromethane, dichloroethane, diethyl ether, ethyl acetate, diethylene glycol, fluorobenzene, heptane, hexane, isobutylmethylketone, isopropyl acetate, methylethylketone, methyltetrahydrofuran, pentyl acetate, n-propyl acetate, tetrahydrofuran, toluene, and any combination thereof.

In certain aspects, the active pharmaceutical ingredient is a small molecule. Exemplary active pharmaceutical ingredients include, but are not limited to, anti-cancer agents, adrenergic agents, antibiotics, anti-viral agents, anesthetics, anti-coagulants, inhibitors of an enzyme, adrenocortical suppressant, steroidal agents, steroidal or non-steroidal anti-inflammatory agents, anti-anxiety, antihistamine, ammonia detoxicant, aldosterone antagonist, immunosuppressant agents, anti-allergic, anti-amebic, anti-androgen, anti-anemic, antigens, vaccines, anti-asthmatic, antibodies, decongestant, sedatives, opioids, pain-relieving agents, analgesics, anti-pyretics, amyotrophic lateral sclerosis agents, anabolic agents, anti-hypertensives, anti-infectives, anti-neoplastic, anorexic agents, anti-psychotic agents, cardiac depressants, anterior pituitary activators, androgens, anti-achne agents, diagnostic aids, analeptic hormones, prostaglandins, etc. Non-limiting examples of APIs include propofol, midazolam, cisatracurium, ciprofloaxin, and others.

As used herein, the term "small molecule" refers to molecules, whether naturally-occurring or artificially created (e.g., via chemical synthesis) that have a relatively low molecular weight. Typically, a small molecule is an organic compound (i.e., it contains carbon). The small molecule may contain multiple carbon-carbon bonds, stereocenters, and other functional groups (e.g., amines, hydroxyl, carbonyls, and heterocyclic rings, etc.). In certain aspects, the molecular weight of a small molecule is at most about 1,000 g/mol, at most about 900 g/mol, at most about 800 g/mol, at most about 700 g/mol, at most about 600 g/mol, at most about 500 g/mol, at most about 400 g/mol, at most about 300 g/mol, at most about 200 g/mol, or at most about 100 g/mol. In certain aspects, the molecular weight of a small molecule is at least about 100 g/mol, at least about 200 g/mol, at least about 300 g/mol, at least about 400 g/mol, at least about 500 g/mol, at least about 600 g/mol, at least about 700 g/mol, at least about 800 g/mol, or at least about 900 g/mol, or at least about 1,000 g/mol. Combinations of the above ranges (e.g., at least about 200 g/mol and at most about 500 g/mol) are also possible.

Also as noted above, the reactor can be used with modular systems and the methods described herein can be used to produce ingestible pharmaceutical compositions. Generally, ingestible pharmaceutical compositions refer to those compositions including an active pharmaceutical ingredient and a pharmaceutically acceptable excipient. As used herein, the term "pharmaceutically acceptable excipient" means a non-toxic, inert solid, semi-solid or liquid filler, diluent, encapsulating material or formulation auxiliary of any type. Some non-limiting examples of materials which can serve as pharmaceutically acceptable excipients are sugars such as lactose, glucose, and sucrose; starches such as corn starch and potato starch; cellulose and its derivatives such as sodium carboxymethyl cellulose, methylcellulose, hydroxypropylmethylcellulose, ethyl cellulose, and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols such as propylene glycol; esters such as ethyl oleate and ethyl laurate; agar; detergents such as Tween 80; buffering agents such as magnesium hydroxide and aluminum hydroxide; alginic acid; water (e.g., pyrogen free water); isotonic saline; citric acid, acetate salts, Ringer's solution; ethyl alcohol; and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

The reactor can also be used with modular systems and the methods described herein to produce pharmaceutical compositions for parenteral administration (including subcutaneous, intradermal, intravenous, intramuscular, and intraperitoneal). Formulations for parenteral administration can be an aqueous or an oil-based solution. Aqueous solutions may include a sterile diluent such as water, saline solution, a pharmaceutically acceptable polyol such as glycerol, propylene glycol, or other synthetic solvents; an antibacterial and/or antifungal agent such as benzyl alcohol, methyl paraben, chlorobutanol, phenol, thimerosal, and the like; an antioxidant such as ascorbic acid or sodium bisulfite; a chelating agent such as etheylenediaminetetraacetic acid; a buffer such as acetate, citrate, or phosphate; and/or an agent for the adjustment of tonicity such as sodium chloride, dextrose, or a polyalcohol such as mannitol or sorbitol. The pH of the aqueous solution may be adjusted with acids or bases such as hydrochloric acid or sodium hydroxide. Oil-based solutions or suspensions may further comprise sesame, peanut, olive oil, or mineral oil.

For topical (e.g., transdermal or transmucosal) administration, penetrants appropriate to the barrier to be permeated are generally included in the preparation. Transmucosal administration may be accomplished through the use of nasal sprays, aerosol sprays, tablets, or suppositories, and transdermal administration may be via ointments, salves, gels, patches, or creams as generally known in the art.

III. Aspects of a Reactor

Turning to the figures, FIGS. 1-4 show an aspect of a reactor chassis 100 comprising a plurality of channels 150a-f on a surface 110 of the chassis arranged in a double spiral configuration. Each channel is operable to accept a plurality of lengths of reactor tubing 160a and 160b. The plurality of channels 150a-f comprises a primary channel 150a comprising a first end 170a at a side 120 of the chassis, and a second end 180a at the side 120 of the chassis 100. The primary channel comprises a first spiral channel 155a connected to the first end 170a, and a second spiral channel 156a connected to the second end 180a, wherein the first spiral channel 155a and the second spiral channel 156a are interleaved and connect at a center 190 of the double spiral 157 to form the primary channel 150a extending from the first end 170a to the second end 180a, wherein the primary channel 150a defines a first reactor tubing path 165a.

The plurality of channels 150a-f also comprises one or more secondary channels 150b-f. All secondary channels 150b-f comprise cross channels 158a-j connecting channel ends 170b-f and 180b-f at a side 120 of the chassis to the primary channel 150a at a connection point 159a-j internal to the primary channel 150a. A secondary channel 150b-f extends from a first cross-channel end 154a,c,e,g,i through the first spiral channel 155a and the second spiral channel 156a at the point of connection 159a-j between the cross-channels 158a-j and the main channel 150a, to the second cross-channel end 154b,d,f,h,j at the side of the chassis. Each secondary channel 150b-f defines a reactor tubing path 165b-f. FIG. 2 depicts an aspect of a chassis comprising a first cross channel and a second cross channel in common with a number of secondary channels.

Figure 3:
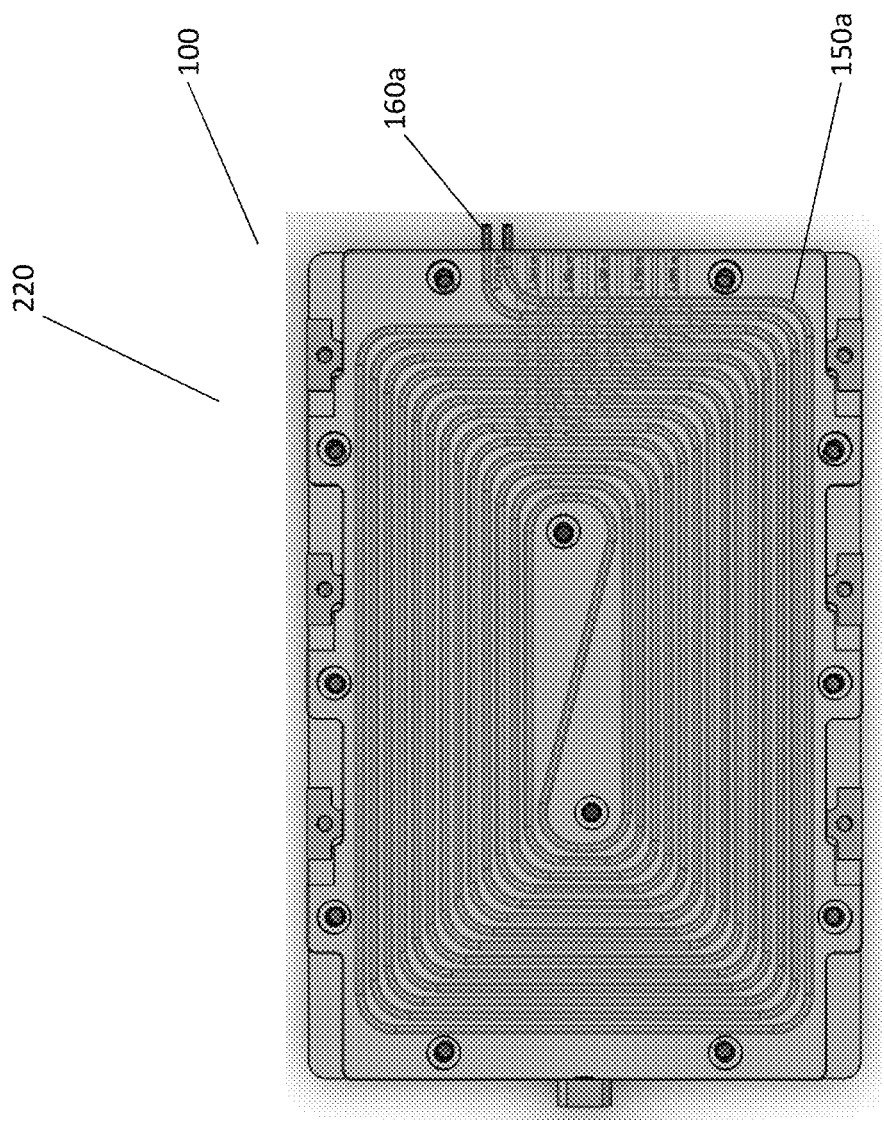
FIG. 3 is a top view of the chassis having reactor tubing installed in the primary channel.
Figure 4:
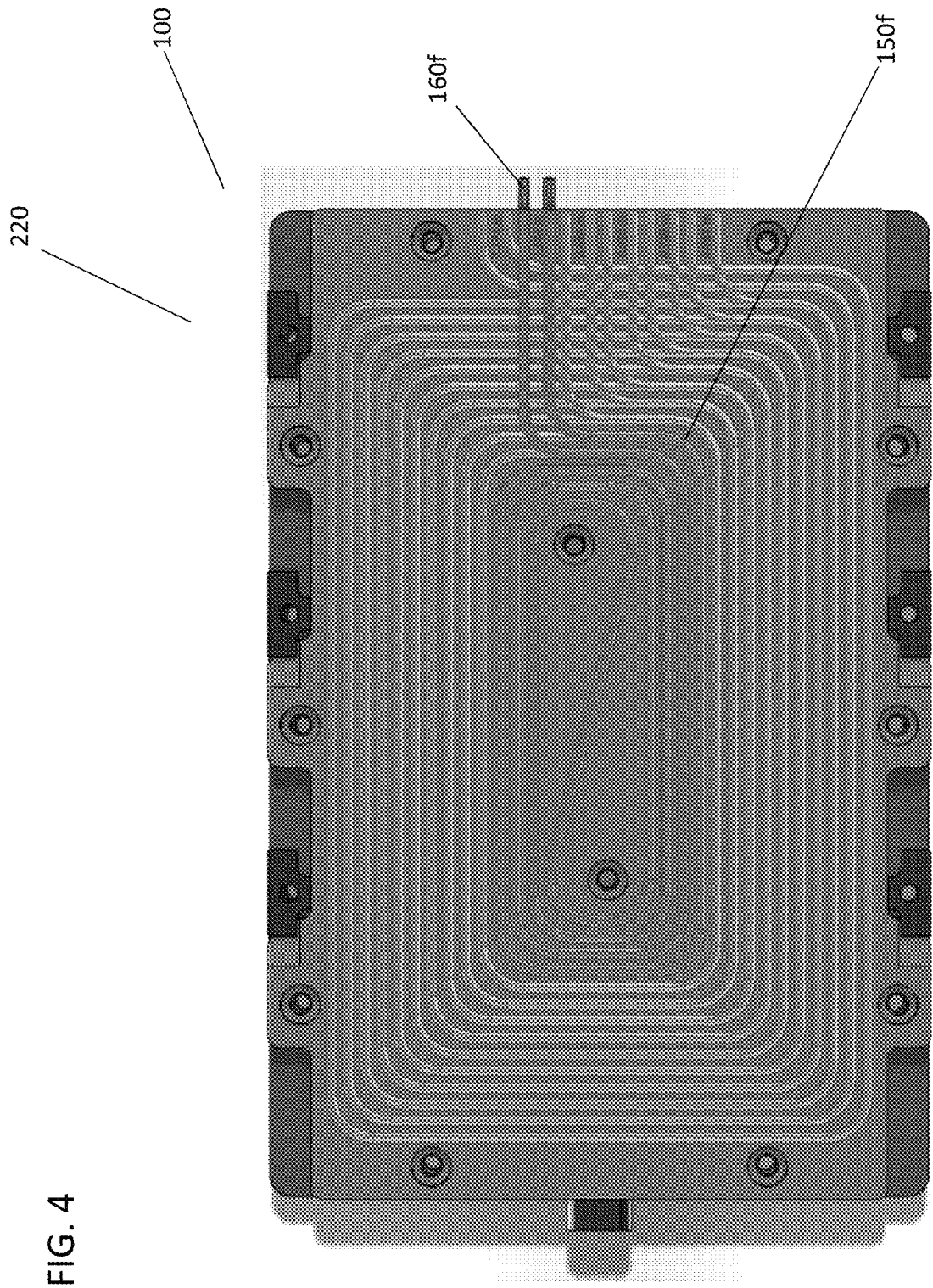
FIG. 4 is a top view of the chassis having reactor tubing installed in a secondary channel.

FIG. 3 shows an assembled reactor 220 comprising a chassis 100 having reactor tubing 160a installed in the primary channel 150a. FIG. 4 shows an assembled reactor 220 comprising a chassis 100 having reactor tubing 160f installed in a secondary channel 150f.

Figure 5:
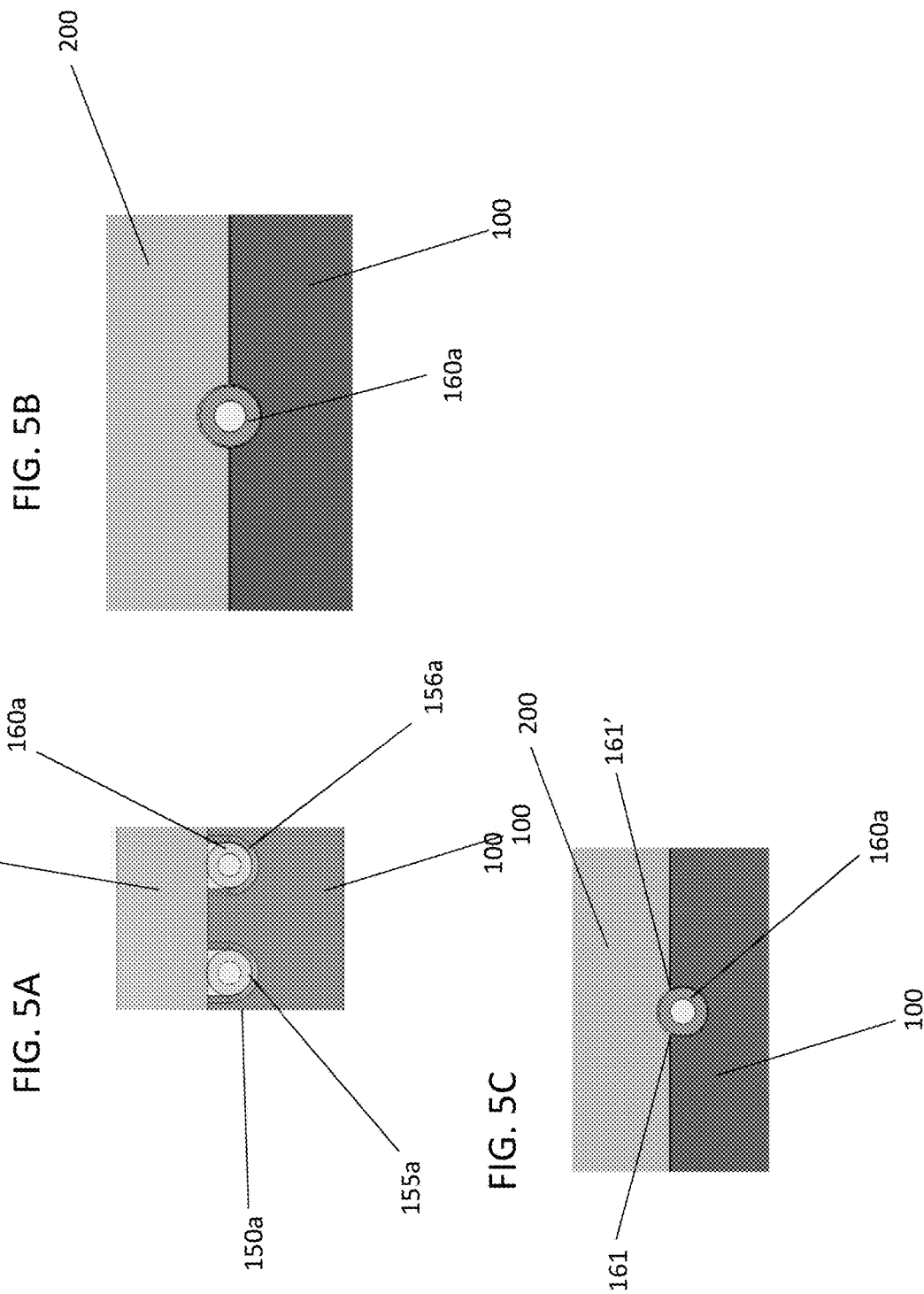
FIG. 5A is a cross section view of an aspect of the chassis having a U-shaped channel with a cover installed.
FIG. 5B is a cross section view of an aspect of the chassis having a semicircular channel with a cover installed, wherein the cover comprises semicircular channels.
FIG. 5C is a cross section view of an aspect of the chassis having a partially circular cross section channel with a cover installed, wherein the cover comprises semicircular channels.
Figure 6:
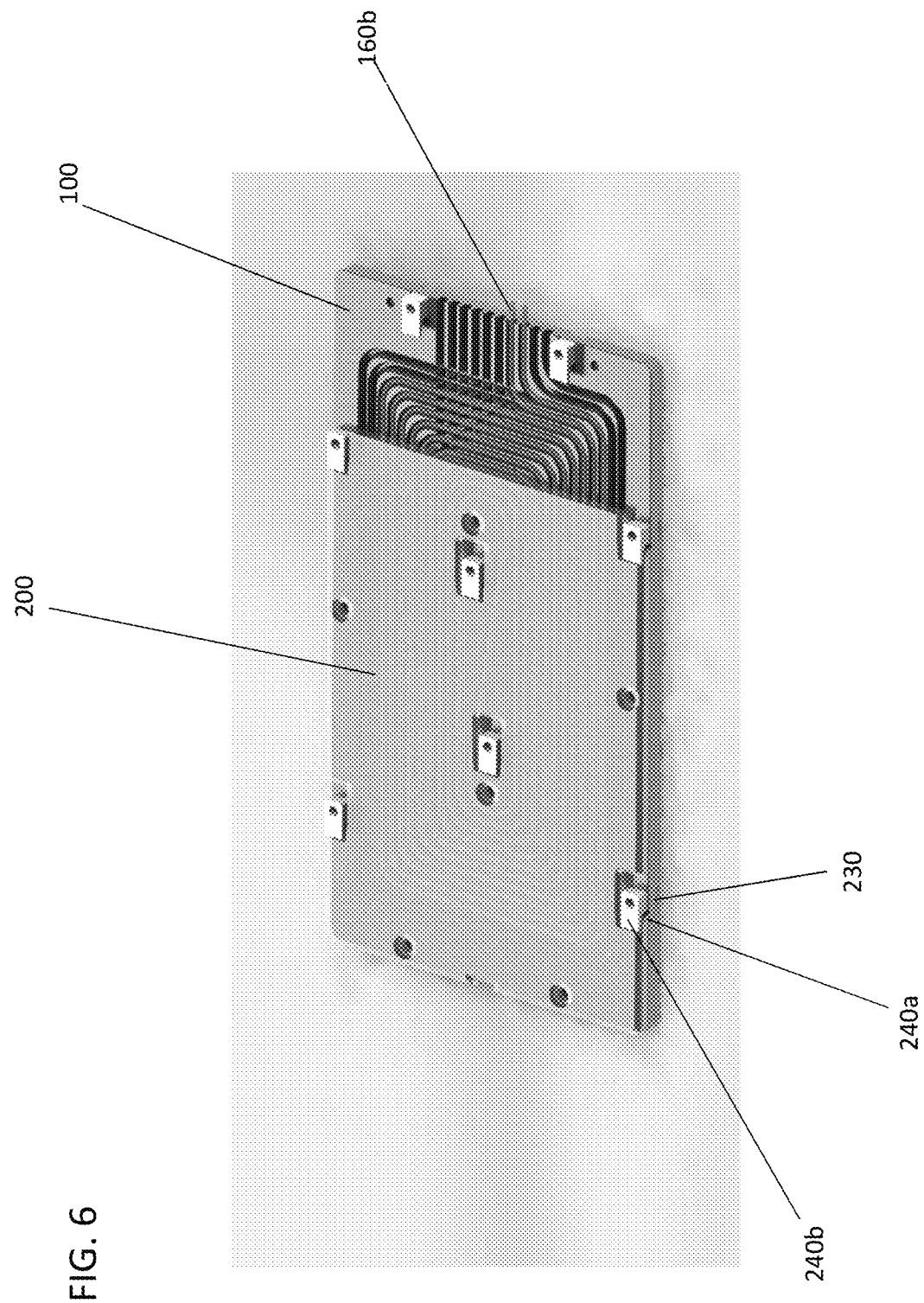
FIG. 6 is a top perspective view of an assembled reactor having a cover partially covering the reactor tubing and chassis of the reactor.
Figure 7:
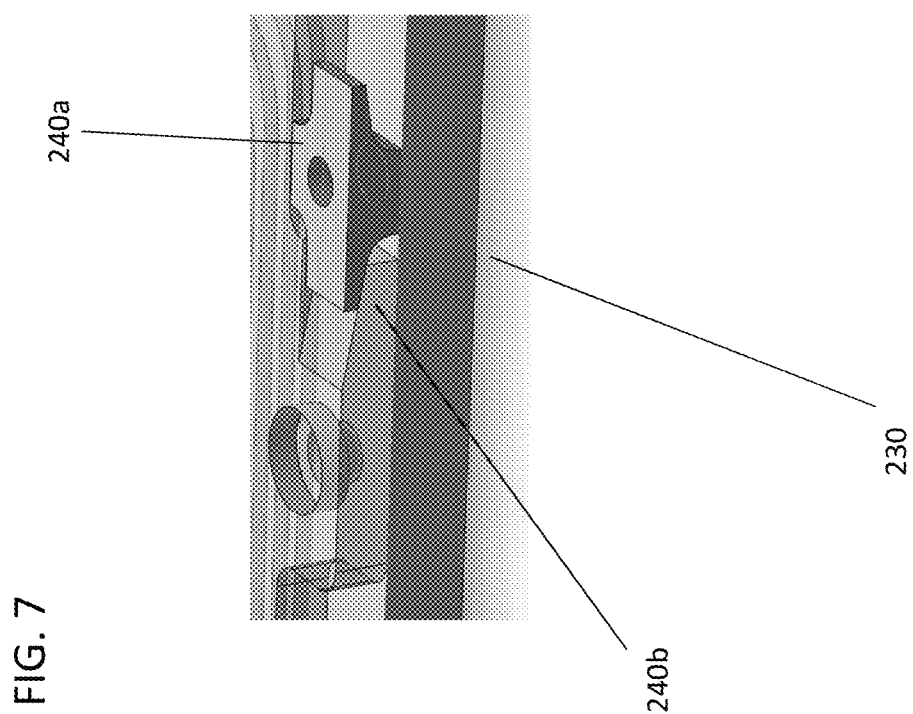
FIG. 7 is a close-up view of a wedge closure used to fasten a cover to a chassis.

FIG. 5A is a cross section of an aspect of a reactor channel 150a having a U-shaped cross section. The first 155a and second 156a spiral channels have the reactor tubing 160a installed therein. A cover 200 is fastened to the chassis. FIG. 5B is a cross section of an aspect of a reactor channel 150a having a semicircular cross section. The first 155a and second 156a spiral channels have the reactor tubing 160a installed therein, and a cover 200 with cover channels 210 covering the reactor tubing 160a and chassis 100. FIG. 5C is a cross section of an aspect of a reactor channel 150a having a partially circular cross section. The first 155a and second 156a spiral channels have the reactor tubing 160a installed therein, and a cover 200 with cover channels 210 covering the reactor tubing 160a and chassis 100. The partially circular cross section provides protrusions that partially surround the tubing to thereby retain the tubing in the channel FIG. 6 shows a top perspective view of an assembled reactor 220 having a cover 200 partially covering the reactor tubing 160b and chassis 100 of the reactor 220. In this aspect, the reactor cover 200 is transparent and is fastened to the chassis 100 with a wedge closure 230 having wedge 240a on the chassis 100 and wedge 240b on the cover. A close-up view of the wedge closure 230 is shown in FIG. 7.

IV. Collection of Reactor Parts

An additional aspect of the present disclosure encompasses a collection of reactor parts and optionally other components that can be attached or connected to the reactor. The collection of parts comprises one or more chassis, one or more lengths of tubing, optionally one or more covers, and additional components for assembly into reactor modules of the instant disclosure. As used herein, the term "reactor module" refers to an assembled reactor of the instant disclosure, optionally further comprising other components that can be connected or attached to the reactor. The various parts of the collection can be assembled into one or more reactor modules suitable for a desired function. For instance, the one or more chassis can include chassis of different sizes, chassis constructed of different materials or combination of materials, chassis comprising different numbers of secondary channels, chassis comprising channels of sizes capable of accommodating reactor tubing of different external diameters, chassis comprising channel ends at different locations relative to the chassis and/or the ends of each channel, and combinations thereof. Similarly, the one or more covers can include covers of different sizes, covers constructed of different materials or combination of materials, covers comprising channels complementary to channels in one or more chassis of the modules, and combinations thereof. Reactor tubing of the module can include tubing of different external diameters, internal diameters, material, lengths, and combinations thereof.

The modules can further comprise other components that can be connected or attached to the reactor to produce a reactor module suitable for the production of a chemical compound such as an active pharmaceutical product. The other components can be as described in Section I herein above

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them unless specified otherwise.

When introducing elements of the present disclosure or the preferred aspects(s) thereof, the articles "a", "an", "the" and "said" are intended to mean that there are one or more of the elements. The terms "comprising", "including" and "having" are intended to be inclusive and mean that there may be additional elements other than the listed elements.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant, both in relation to the other endpoint, and independently of the other endpoint.

It is understood that throughout this specification the identifiers "first" and "second" are used solely to aid in distinguishing the various components and steps of the disclosed subject matter. The identifiers "first" and "second"

are not intended to imply any particular order, amount, preference, or importance to the components or steps modified by these terms.

As various changes could be made in the above-described reactors and methods without departing from the scope of the invention, it is intended that all matter contained in the above description and in the examples given below, shall be interpreted as illustrative and not in a limiting sense.

What is claimed is:

1. A continuous flow reactor comprising:
 a. a chassis for a continuous flow reactor comprising a plurality of channels on a surface of the chassis arranged in a double spiral configuration, each operable to accept a plurality of lengths of reactor tubing, wherein the plurality of channels comprises:
  i. a primary channel comprising a first end at a side of the chassis, a second end at a side of the chassis, a first spiral channel connected to the first end, and a second spiral channel connected to the second end, wherein the first spiral channel and the second spiral channel are interleaved and connect at a center of the double spiral to form the primary channel extending from the first end to the second end, wherein the primary channel defines a first reactor tubing path comprising an inlet and an outlet; and
  ii. a secondary channel comprising a first cross-channel extending from a first cross-channel end at a side of the chassis to a connection point within the first spiral channel, and a second cross-channel extending from a second cross-channel end at a side of the chassis to a connection point within the second spiral channel, wherein the second channel defines a second reactor tubing path comprising an inlet and an outlet;
 b. reactor tubing installed in a channel of the chassis; and
 c. optionally a cover for partially and completely covering the chassis and the reactor tubing.

2. The reactor of claim 1, wherein a cross section of the channels is a U shape.

3. The reactor of claim 1, wherein a cross section of the channels is a semicircle.

4. The reactor of claim 3, further comprising a cover comprising semicircular channels on a surface of the cover corresponding to the channels in the chassis.

5. The reactor of claim 1, further comprising a cover.

6. The reactor of claim 5, wherein the chassis and the cover comprise means for fastening the cover to the chassis.

7. The reactor of claim 6, wherein the means for fastening the cover to the chassis are a wedge on the cover and a complementary notch on the chassis.

8. The reactor of claim 1, wherein the chassis comprises a total of 2, 3, 4, 5, 6, 7, 8, 9, 10, or more channels.

9. The reactor of claim 8, wherein the chassis comprises a first cross channel and a second cross channel for each secondary channel.

10. The reactor of claim 8, wherein the chassis comprises one first cross channel and one second cross channel shared by one or more secondary channels.

11. The reactor of claim 1, wherein the ends of each channel are adjacent with respect to each other.

12. The reactor of claim 1, wherein the ends of all channels are at one side of the chassis.

13. The reactor of claim 1, wherein the chassis is an aluminum chassis.

14. The reactor of claim 1, wherein the cover is transparent or translucent.

15. The reactor of claim 1, wherein the chassis is an aluminum chassis and the cover is transparent or translucent.

16. A method of synthesizing a chemical compound, the method comprising:
 a. providing or having provided one or more input materials;
 b. transporting the one or more input material through a continuous flow reactor of claim 1 in a reactor input stream; and
 c. subjecting the one or more input materials in the reactor to cause a chemical reaction between the input materials;
 wherein materials output from the reactor in a reactor output stream comprises the chemical compound.

17. The method of claim 16, wherein the chemical compound is an active pharmaceutical compound (API) or a precursor of an API.

18. The method of claim 16, wherein one or more of the input materials is a product of a chemical reaction conducted in a second reactor fluidically connected with the reactor of claim 1.

19. The method of claim 16, wherein the reactor is fluidically connected with modules fluidically connected with the reactor.

20. The method of claim 19, wherein the modules are selected from feedstock reagent kits or reservoirs, heaters, valves, flow meters, waste reservoirs, separators, crystallizers, pumps, inline mixers, pressure transducers, controllers, and any combination thereof.

* * * * *